Patented Jan. 2, 1923.

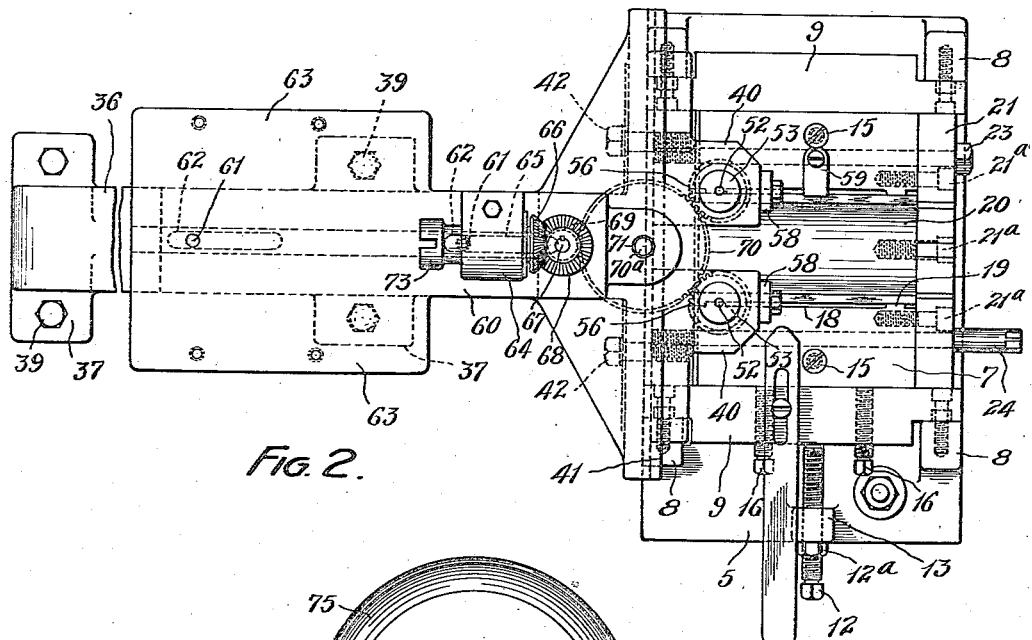
Fig. 2.
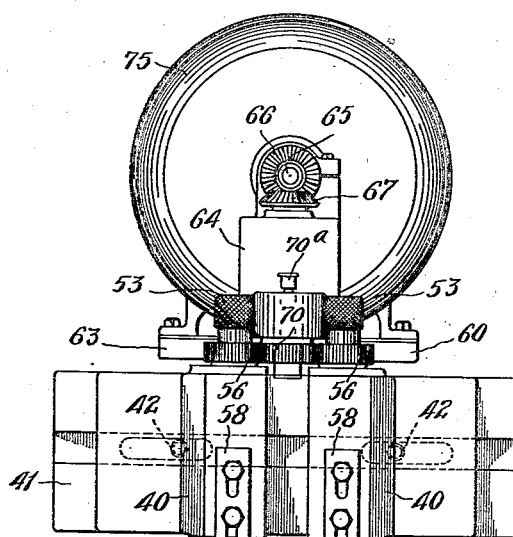
Fig. 3.
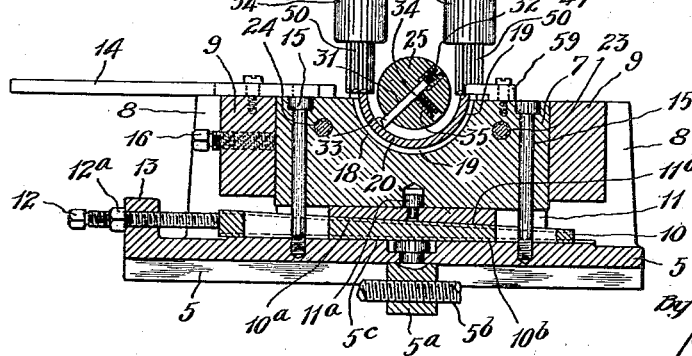
Inventor:
HENRY C. HOOK.
By B. D. Watts
Attorney.

1,440,602

UNITED STATES PATENT OFFICE.

HENRY C. HOOK, OF WINDSOR, VERMONT, ASSIGNOR, BY MESNE ASSIGNMENTS, TO ALUMINUM MANUFACTURES, INCORPORATED, OF CLEVELAND, OHIO, A CORPORATION OF DELAWARE.

COMBINED BORING AND MILLING MACHINE.

Application filed October 14, 1920. Serial No. 416,895.

*To all whom it may concern:*

Be it known that I, HENRY C. HOOK, a citizen of the United States, residing at Windsor, county of Windsor, State of Vermont, have invented a certain new and useful Improvement in Combined Boring and Milling Machines, of which the following is a specification, reference being had therein to the accompanying drawings.

This invention relates to combined boring and milling machines and is especially concerned with a machine capable of simultaneously boring the interior and milling the edges of semi cylindrical bearings.

One object of the invention is to construct a combined boring and milling machine for semi cylindrical work blanks.

Another object is to construct a machine for milling parts of a work blank while boring or turning other parts thereof.

Another object is to construct a combined boring and milling machine which will simultaneously form both plane and curved surfaces on semi cylindrical work blanks.

Another object is to construct an improved work carrying cross slide for combined boring and milling machines in which work blanks of various sizes may be mounted for simultaneous boring and milling operations.

Another object is to construct an improved work holding device adapted to hold semi cylindrical work blanks without distortion thereof during machining operations.

Another object is to construct a machine capable of milling the longitudinal edges of a substantially semi cylindrical bearing and simultaneously therewith boring or turning the interior surface of the bearing.

Other objects more or less subordinate to these will be pointed out hereinafter.

For the purpose of illustrating my invention, I have chosen to describe a specific form of apparatus adapted to the machining of semi cylindrical bearings, and have shown the various parts of such apparatus in the accompanying drawings in which, Fig. 1 is a side elevation partly in section of a machine constructed in accordance with my invention, parts being broken away.

Fig. 2 is a top plan view of the milling mechanism and cross slide shown in Fig. 1.

Fig. 3 is an end elevational view, partly in section, taken on line 3—3 of Fig. 1.

Fig. 4 is a side view of a boring bar for use with my machine.

Figure 1:
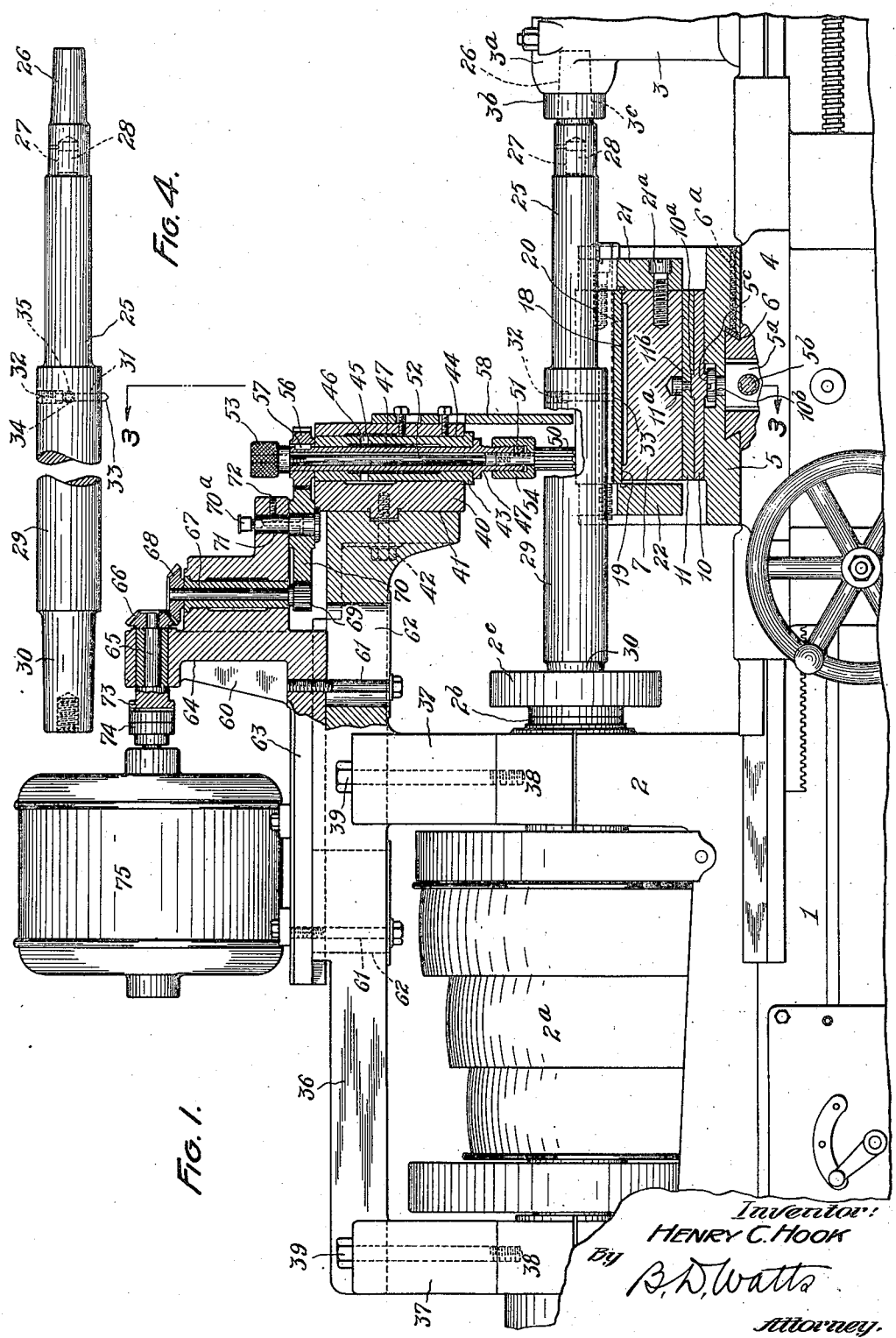

Since certain parts of the specific machine herein set forth are similar to certain parts of the ordinary well known lathe such parts have, with a view to simplicity in drawings and descriptions been shown with portions broken away and are described only briefly.

In the drawings 1 indicates as an entirety an ordinary cone driven lathe with the legs or supports and portions of the base and other parts broken away. 2 indicates the usual lathe head stock, $2^a$ the ordinary cone pulleys and $2^b$ a live shaft which is preferably hollow and to which may be attached a chuck $2^c$, while 3 indicates an adjustable tail stock having the ordinary head $3^a$ and adjustable socket member $3^b$ provided with a central bore. A movable carriage is indicated by 4. All these parts are common and well known lathe parts requiring no further description.

Upon the carriage 4 is mounted a cross slide 5 having dove tailed tongue and groove connection with the carriage, the gib 6 and adjusting screws $6^a$ being employed to insure a close sliding fit between the two members at all times. The slide 5 is adapted for engagement with a nut $5^a$ carried on a threaded rod $5^b$ rotatably secured in the carriage by which means the cross slide may be moved laterally on the carriage.

An adaptor or work holding block 7, which preferably is made specially for every different sized bearing or work blank is adjustably secured on the cross slide 5 between pairs of vertical posts 8. Horizontal filler blocks 9 which are reversibly secured to posts 8 fill the spaces between the adaptor and the posts on each side of the adaptor and by reason of their shape and reversibility can accommodate adaptors of several different lengths as may be necessary for bearings of various sizes.

Wedge plates 10 and 11 interposed between cross slide 5 and the bottom of adaptor 7 serve to elevate and adjust the adaptor with respect to the cutting tools, later to be described. Plate 11 is attached to the bottom of adaptor 7 by a headed pin $11^a$ which seats in openings in the plate and adaptor. Plate 10 is maintained in alignment with plate 11 and slide 5 by ribs 10ª, 10ᵇ which extend lengthwise of the plate for its entire length and which engage with corresponding grooves 11ᵇ and 5ᶜ formed in plate 11 and slide 5 respectively. Plate 10 which is free to move on slide 5 is actuated by a screw 12 which has threaded engagement with a projection 13 on the surface of the cross slide and engages the end of the plate. A nut 12ª may be used to lock the screw 12 in any position.

In adjusting the adaptor relative to the filler block 9, a guide 14 secured to one block as shown, may be used. After the adaptor 7 has been properly positioned, it may be secured in place by screws 15 which pass vertically through the adaptor and slots in the wedge plates and have screw threaded engagement with cross slide 5. Set screws 16 passing horizontally through filler blocks 9 engage with sides of the adaptor 7 and assist in positioning and securing the adaptor relative to the blocks 9 and cross slide 5.

The upper surface of adaptor 7 is provided with a semi circular depression 18 suitably formed with a plurality of raised portions 19 machined accurately to size and adapted to support a bearing 20. Two series of such portions are shown in Fig. 1 but more may be used, as for example with long bearings which require central supports.

Bearings may be conveniently held in place in depression 18 by being clamped between end plates 21 and 22. These plates are assembled on opposite sides of adaptor 7 with their upper curved surfaces formed with projections similar in shape and size to the raised portions 19 of adaptor 7, having their top surfaces when assembled with adaptor located slightly above the top of portions 19 so as to engage the ends of the bearings supported by the latter without being in the path of the cutting tools.

The bearings are thus clamped lengthwise between plates which contact with several parts of the end surfaces thereof. Due to this longitudinally applied pressure on the bearings and to the support at the back thereof, the bearings are held free from distortion during machining with the result that the finished bearings are uniformly very accurate.

Plate 21 is secured to adaptor 7 by equally spaced screws 21ª while plate 22 is moved toward and away from adaptor 7 and consequently into clamping engagement with and release from bearing 20 by screws 23 and 24. These screws which have threaded engagement at their ends with plate 22, pass freely thru adaptor 7 and plate 21, each screw having a shoulder, head or other enlarged portion for contact with the face of plate 21. By reason of such shoulder or head the plates are drawn toward each other when the screws are threaded into plate 22 and are clamped to the adaptor and any bearing or work piece therein. For convenience in operation screw 24 is provided with an elongated shank and a squared end to which a hand wheel may be fitted.

To accommodate bearings of various diameters or lengths or other work pieces, it may be necessary to provide, as special parts, an adaptor 7, plates 21 and 22 and screws 23 and 24 all of proper size and shape for accommodating the desired bearing or work piece.

With the desired cross slide and parts and a bearing all suitably positioned on carriage 4 as shown, a boring or turning operation may be performed on the bearing by various means. Preferably, however, I employ a boring bar 25 as shown in Fig. 4 which consists of two parts. A part 26 of bar 25 which is tapered at one end to engage frictionally in the bore of member 3ᵇ, is centrally bored, as at 27, in its forward end to receive a correspondingly shaped extension 28 of the part 29 of the bar 25. Lubricant may be placed in this bored opening 27 to reduce friction between the parts when extension 28 rotates therein. Tapered end 30 of part 29 frictional engages with the bored shaft of the shaft 2ᵇ or may be gripped by the jaws (not shown) of a chuck 2ᶜ or otherwise secured to the live shaft so as to be rotated thereby.

Bar 29 has a diametrically extending opening or bore 31 which is screw threaded at one end for engagement with a headless set screw 32. A cutting tool 33 located in opening 31 is adjusted for various depths of cuts by the set screw 32 and is locked in any desired position by a set screw 34 which has screw threaded engagement in an opening 35 extending at substantially right angles to opening 31. The cutting tool is adapted, when properly positioned in the boring bar and the latter rotated, to take any desired depth of cut of metal from the inner surface of a bearing 20 as the bearing is moved by carriage 4 in the well known manner.

The part of the machine adapted to performing a milling operation on the bearing is conveniently supported on the head 2. A base 36 having integral depending posts 37 suitably positioned and shaped to seat upon the bearing caps 38 is secured to the head 2 by long screws 39 which replace the usual bearing cap screws and which extend thru the posts 37 and bearing covers and into the threaded bearing cap screw holes in the head 2. Posts 37 are of such length that base 36 will not contact or interfere with the operation of cone pulleys 2ª, or gear drive housing, if such driving means is used instead of pulleys.

At the rear end of base 36 one or more, in this case two, vertically bored spindle carriers 40 have a tongue and groove engagement with the end surface 41 of base 36 securing means such as screws 42 holding these carriers in any desired position.

Each spindle carrier 40 is provided with a bushing 43 secured in any suitable way in the vertical bore 44, an enlargement 45 being formed in the bore to receive lubricant and to feed it into the enlarged bore of the bushing through suitable holes 46, or otherwise. Extending through bushing 43 is an elongated hollow spindle 47 having a bearing at each end of the interior of the bushing. The shank of a milling cutter 50 is mounted in the lower end of spindle 47 and prevented from rotation relative thereto by a key and key way 51 or other suitable means. Onto the end of the shank of cutter 50 is threaded a rod 52 which extends thru spindle 47 and has threaded engagement with a nut 53. This nut which seats on the end of spindle 47 serves to adjust the cutter 50 relative to spindle 47. Cap nut 54, interiorly threaded to engage threads in the spindle 47 permits adjustment of the cutter relative to spindle 47 and, incidently, to the work blank 20 and prevents upward displacement of the cutter due to its contact with the work blank.

The nut 53, by reason of its diameter as shown, serves a second purpose, namely to hold, in assembled relation, spindle 47 and a pinion 56 attached thereto by a key and key way 57, or other suitable means.

Guards 58 adjustably fastened to the face of spindle carriers 40 serve to brush dirt and chips off the surfaces with which the milling cutters are to engage. One guard also moves out of the path of the milling cutter, guide 59, which is pivotally mounted on adaptor 7 to act as a stop in locating the bearing in depression 18.

A movable, secondary base or gear carrying member 60 is adjustably secured to base 36, as by screws 61 which pass through slots 62 in base 36 and permit movement of member 60 thereon.

Member 60 comprises a flat portion 63 and a bracket portion 64. Within bushings located in bored openings in this latter portion is mounted for rotation, a horizontal shaft 65, having at one end a bevel gear 66, and a vertical shaft 67 carrying at one end a bevel gear 68 which meshes with pinion 66, and at the other end a pinion 69 which meshes with a larger gear 70. This gear 70 is rotatably mounted on a shaft 71 which is secured in the member 60 by set screw 72 as shown. This gear 70 also meshes with pinions 56, and is adapted to mesh with these pinions in all positions of the spindle carriers 40. When the spindle carriers are moved toward one another or apart, member 60 is adjusted correspondingly to bring gear 70 into mesh with pinions 56, such movement of member 60 being provided for by the slots 62 and screws 60 above mentioned. Lubricant may be supplied to gear 70 by oil cup 70ª and ducts leading from it to the gear.

The source of power for, and manner of, connecting it to the gears of the milling device may vary, it being understood that suitable rotational movement of the gears and cutters only is required. A simple means of rotating the gears and cutters is shown. The shaft 65 is provided, at the end opposite the gear 66, with a split head 73 for engagement with a correspondingly shaped extension 74 of the rotatable shaft of an electric motor 75 which is mounted on flat portion 63 of member 60.

In the operation of the machine described the bearing is locked in adaptor 7, between end plates 21 and 22 and is adjusted with respect to the boring bar cutter, and milling cutters. Applications of power to the cone pulleys or gears driving the boring bar and carriage causes the boring bar to rotate and the carriage to move forward, the cutting tool 33 turning or boring the inner surface of the bushing as the latter approaches the head 2. Rotation of the motor 75 causes rotation of the milling cutters 50 which remove edge portions of the bearing, closely following the boring tool and operating simultaneously therewith.

By reason of the accurately formed adaptor with any suitable number of surfaces supporting the work piece and the method of clamping the adaptor between end plates, the work piece is supported and held for machining without being distorted, consequently it is possible to obtain finished work pieces having a relatively high degree of accuracy on finished surfaces and practically free from distortion as compared with work pieces machined by ordinary methods.

Furthermore it will be noted that a wide range of work blank sizes can be accommodated by this machine due to the adjustment obtained by using the removable adaptor, the wedge plates, the adjustable turning cutter and the adjustable spindle carriers and milling cutters.

While I have described in detail the various parts of a specific form of apparatus embodying the principles of my invention, I do not desire to be limited thereto since many modifications may be made in the apparatus of the method of apply or using it without departing from the scope or spirit of what is claimed.

What I claim is:

1. In a combined boring and milling machine in combination; a supporting frame, a movable carriage mounted thereon, a cross slide connected to the carriage and adapted to support a work blank for simultaneous milling and boring operations, a horizontal, rotatable shaft and a tail stock mounted on said frame, a rotatable boring bar connected to the said horizontal shaft and supported by the said tail stock and carrying a cutting tool adapted to engage the work blank and a milling cutter secured to the said supporting frame for engagement with the work blank.

2. In a combined boring and milling machine in combination; a supporting frame, a movable carriage mounted thereon, a cross slide connected to the carriage, an adaptor carried by the cross slide and formed to support a work blank for simultaneous milling and boring operations, end plates secured to the adaptor for clamping a work blank in position in the adaptor, a horizontal, rotatable shaft and a tail stock mounted on the said frame, a rotatable boring bar connected to the said horizontal shaft and supported by the said tail stock and carrying a cutting tool adapted to engage the work blank and, a milling cutter secured to the said supporting frame for engagement with the work blank.

3. In a combined boring and milling machine in combination; a supporting frame, a movable carriage mounted thereon, a cross slide connected to the carriage, an adaptor carried by the cross slide and formed to support a work blank for simultaneous milling and boring operations, end plates engaging the end surfaces of the work blank for securing it in position in the adaptor, a horizontal, rotatable shaft and a tail stock mounted on the said frame, a rotatable boring bar connected to the said horizontal shaft and supported by the said tail stock and carrying a cutting tool adapted to engage the work blank and a milling cutter secured to the said supporting frame for engagement with the work blank.

4. In a combined boring and milling machine in combination; a supporting frame, a movable carriage mounted thereon, a cross slide connected to the carriage, an adaptor carried by the cross slide and formed to support a semicylindrical work blank, end plates engaging the end surfaces of a semicylindrical work blank for securing it in position in the adaptor, a horizontal, rotatable shaft and an end rest mounted on the said frame, a rotatable boring bar connected to the said horizontal shaft and supported by the said end rest and carrying a cutting tool adapted to engage the work blank and a milling cutter secured to the said supporting frame, for engagement with the work blank.

5. In a combined boring and milling machine, in combination; a supporting frame, a movable carriage mounted thereon, a cross slide connected to the carriage and adapted to support a work blank for simultaneous milling and boring operations, a horizontal rotatable shaft and a tail stock mounted on the said frame, a rotatable boring device comprising a boring bar connected to the said horizontal shaft and supported by the tail stock and carrying a cutting tool adapted to engage the work blank, a milling device comprising a base attached to the said supporting frame, a spindle rotatably secured to the said base, and a milling cutter attached to the said spindle and adapted to engage the work blank while the latter is engaged by the said cutting tool, and means for rotating the boring bar and the milling cutter to perform simultaneous boring and milling operations on the said work blank.

6. In combined boring and milling machine in combination, a frame, a movable carriage thereon adapted to carry a work blank for simultaneous boring and milling operations, means for forming a separate curved surface on a work blank, and means for milling an edge of the said work blank comprising a milling cutter and spindle secured thereto, the said cutter and spindle being adjustable to engage work blanks of various sizes.

7. In a combined boring and milling machine a frame, a work blank carrying carriage, means for forming a curved surface on a work blank carried thereby, and means for forming a plane surface on the said work blank simultaneous with the formation thereon of the said curved surface, the last said means comprising a base secured to the said frame, a rotatable spindle movably mounted thereon and means carried by the said base for actuating the said spindle.

8. In a combined boring and milling machine in combination, a frame, a movable work blank holding carriage, means for forming a curved surface on a work blank carried thereby, and separately mounted means for simultaneously forming plane surfaces on the said work blank adjacent said curved surface comprising rotatable milling cutters mounted for independent horizontal movement and adapted to engage the said work blank and means carried by the frame for actuating a milling cutter.

9. In a combined boring and milling machine in combination; a supporting frame, a movable carriage mounted thereon, a cross slide connected to the carriage and adapted to support a work blank for simultaneous milling and boring operations, a horizontal, rotatable shaft and a tail stock mounted on the said frame, a rotatable boring device comprising a boring bar connected to the said horizontal shaft and supported by the tail stock and carrying a cutting tool adapted to engage the work blank, a milling device mounted on the said supporting frame comprising a base member secured to the frame, an adjustable spindle carrying member attached to the base member, a rotatable spindle attached to the said spindle carrying member, a milling cutter adjustably attached to the said spindle, and adapted to engage the work blank while the latter is engaged by the said cutting tool, and means for simultaneously rotating the boring bar and the milling cutter.

10. A machine for milling and boring semi cylindrical work blanks comprising in combination, means for holding a work blank without distortion for simultaneous milling and boring operations, cutting means for forming a curved surface on the work blank independently actuated, cutting means for forming a plane surface on the said work blank during the formation thereon of the said curved surface and means for moving the work blank into contact with the said cutting means.

11. A machine for forming curved and plane surfaces on a work blank, comprising in combination means for forming a curved surface on a work blank independently actuated, means for forming a plane surface on the said work blank substantially simultaneous with the formation thereon of the said curved surface and adjustable means for mounting the work blank for engagement by the said surface forming means.

12. In a combined boring and milling machine in combination, means comprising a cutting tool adapted to form a convexly curved surface on a work blank, an independently mounted means comprising a second cutting tool adapted to form on a blank a plane surface along the edge of the said curved surface substantially simultaneously with the formation thereon of the curved surface.

13. In a combined boring and milling machine in combination, movable means for mounting a work blank, rotatable means comprising a boring bar and cutting tool carried thereby and adapted to form a curved surface on a work blank, and means separate from the said boring bar and its cutting tool adapted to form plane surfaces on the said blank along the sides of the said curved surface comprising a plurality of independent rotatable milling cutters.

14. In a combined boring and milling machine in combination, means for mounting a semi-cylindrical work blank for substantially simultaneous formation thereon of adjacent curved and plane surfaces, means comprising a boring bar adapted to form a curved surface on the said work blank, and a plurality of milling cutters adapted to form plane surfaces on the said work blank along the sides of the said curved surface, the said milling cutters being independent of each other and of the said boring bar.

15. In a combined boring and milling machine in combination, movable means for mounting a work blank, means comprising a rotatable boring bar adapted to form a curved surface on a work blank carried by the said movable means, and means comprising a plurality of milling cutters adapted to form plane surfaces on the said work blank adjacent the side edges of the curved surface, the said milling cutters adapted for horizontal movement independent of each other and of the said boring bar, the milling cutters having a common actuating mechanism.

16. An attachment for the head stock of a lathe comprising in combination a base adapted to be secured to the head stock, a member movable longitudinal of the lathe and adjustably secured to the base, a rotatable spindle carried by the said base, a cutting tool attached to the spindle and means carried by the said movable member for rotating the said spindle and cutting tool.

In testimony whereof, I hereunto affix my signature.

HENRY C. HOOK.